Jan. 12, 1965   P. C. FIELDSEND   3,165,177
BRAKING SYSTEMS FOR VEHICLES
Filed Nov. 23, 1962   5 Sheets-Sheet 1
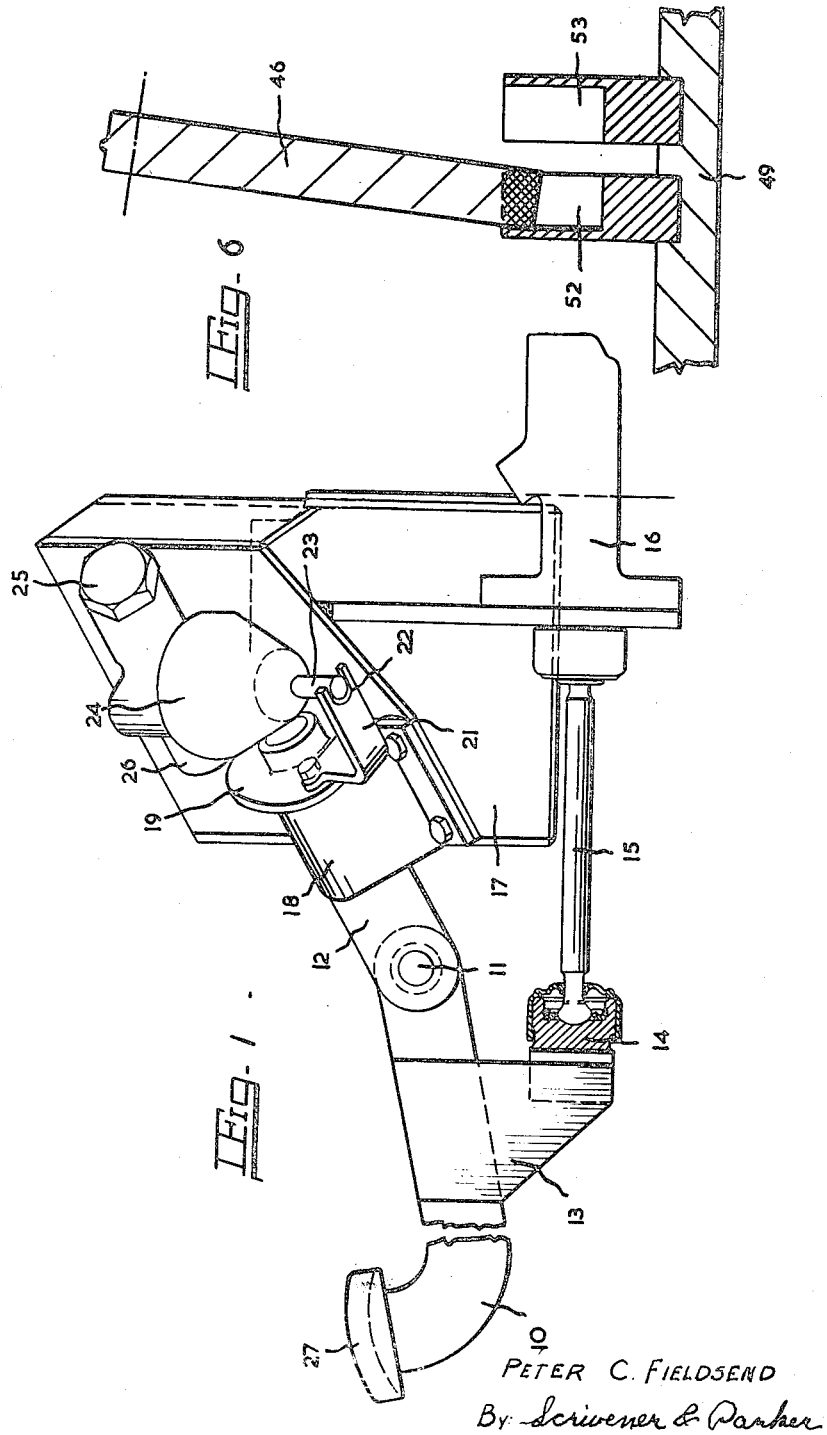
PETER C. FIELDSEND
By Scrivener & Parker Jan. 12, 1965   P. C. FIELDSEND   3,165,177
BRAKING SYSTEMS FOR VEHICLES
Filed Nov. 23, 1962   5 Sheets-Sheet 2
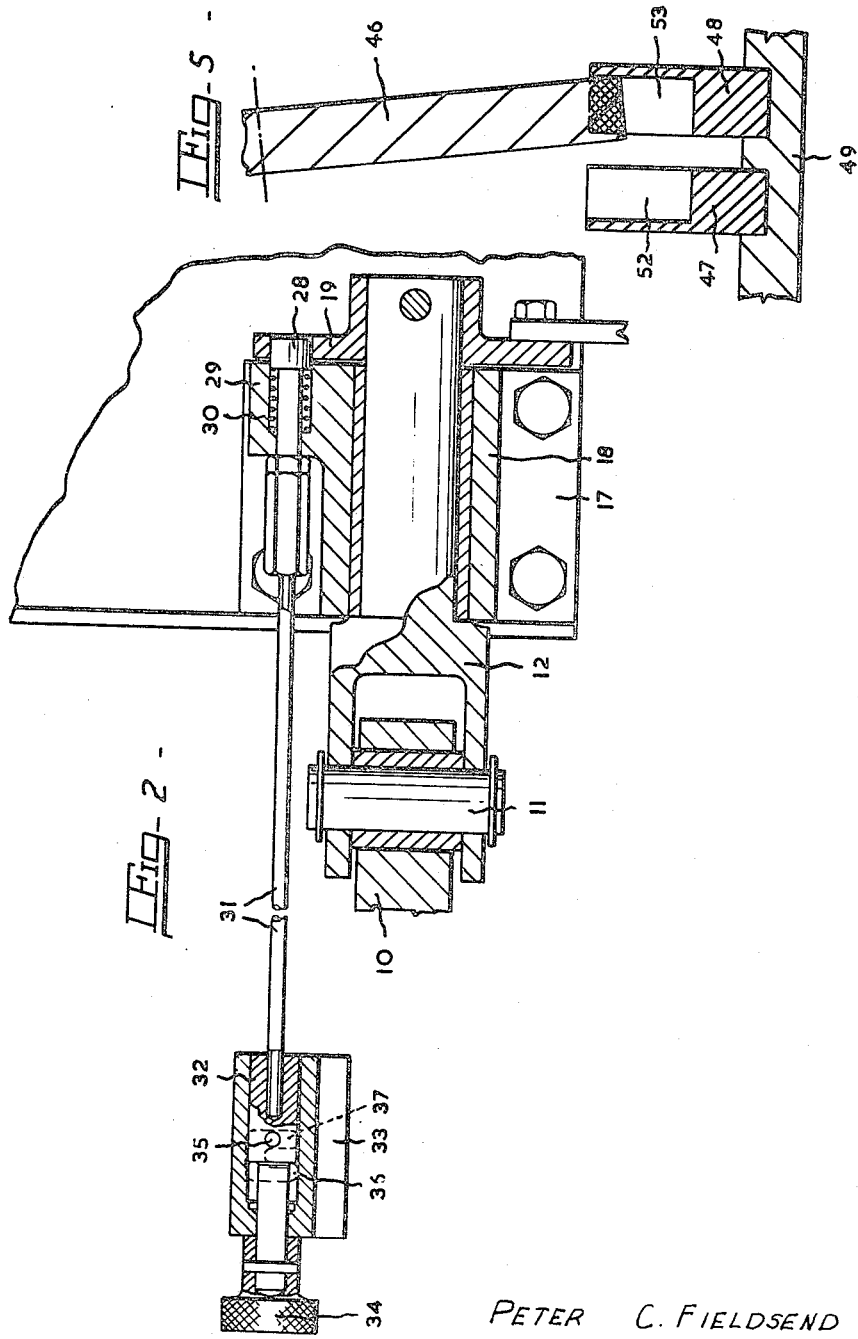
PETER C. FIELDSEND
By: Scrivener & Parker

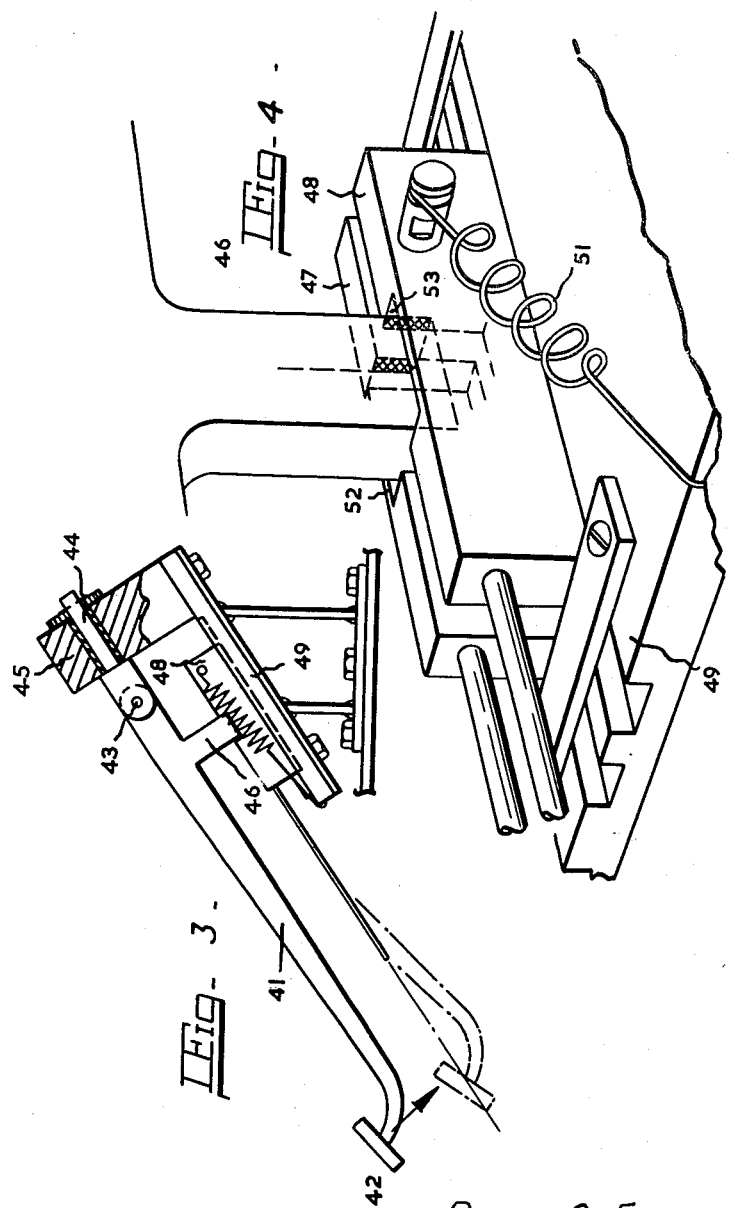

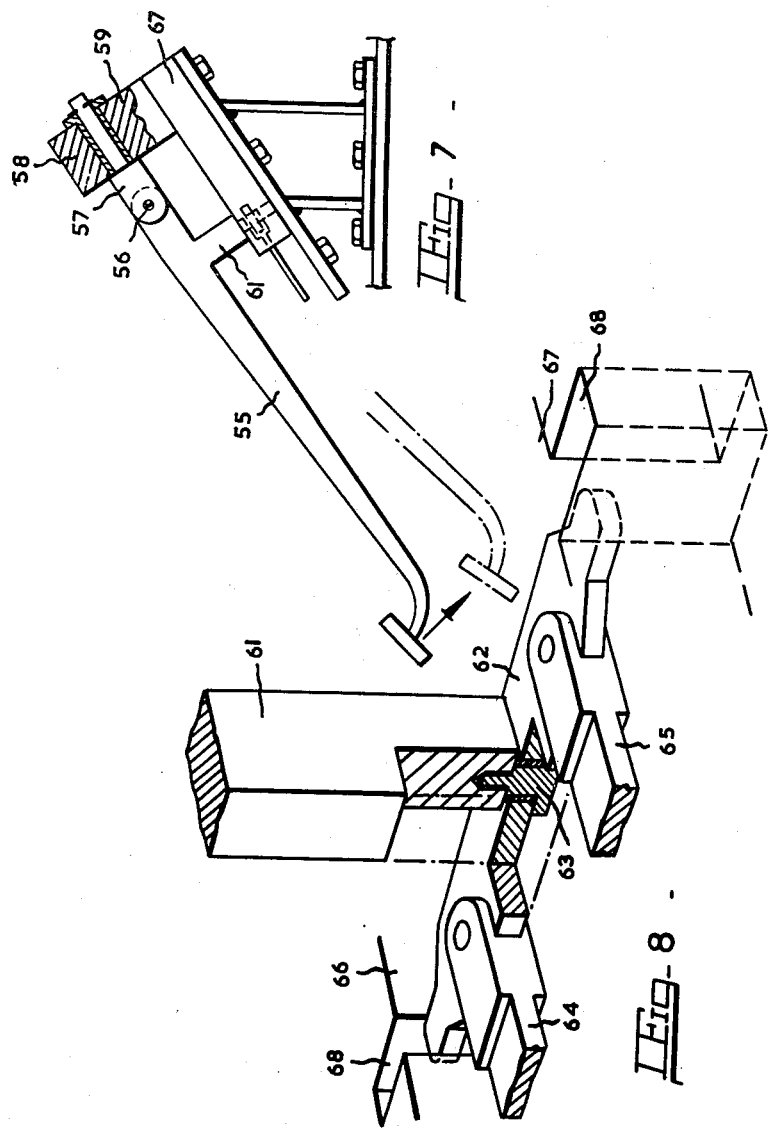

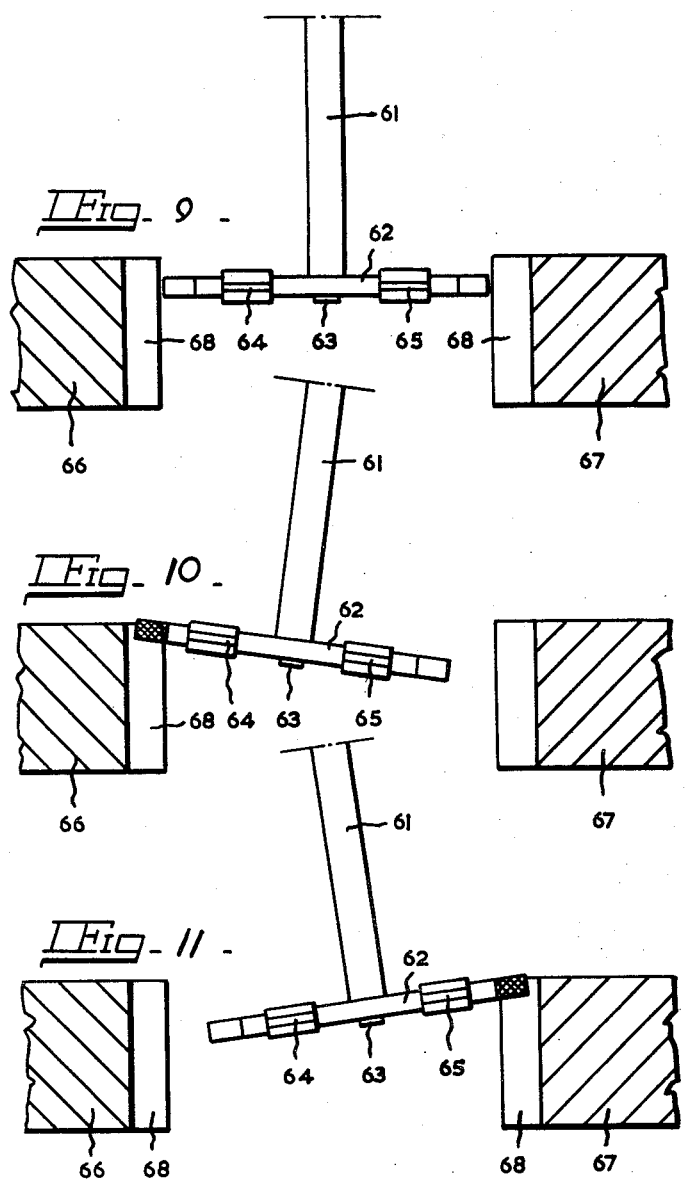

United States Patent Office 3,165,177
Patented Jan. 12, 1965

3,165,177
BRAKING SYSTEMS FOR VEHICLES
Peter Camplin Fieldsend, Hollywood, England, assignor to Girling Limited, Tyseley, England, a British company
Filed Nov. 23, 1962, Ser. No. 239,550
Claims priority, application Great Britain, Nov. 23, 1961, 41,879/61; Jan. 9, 1962, 754/62
5 Claims. (Cl. 188—152)

This invention relates to improvements in braking systems for vehicles, and more particularly to braking systems for vehicles such as tractors in which brakes on wheels on opposite sides of the vehicle can be applied independently for steering or can be applied simultaneously for retarding the progress of the vehicle.

According to our invention, means for applying brakes on wheels on opposite sides of a vehicle comprise a pedal which is angularly movable about two axes at right angles to each other, the pedal being movable angularly about one axis for applying the brakes and about the other axis for causing the force applied to the pedal to be transmitted to the brakes on wheels on either or both sides of the vehicle.

Three embodiments of our invention are illustrated by way of example in the accompanying drawings in which:

FIGURE 1 is a side elevation of a brake pedal for applying hydraulically brakes on opposite sides of a tractor or like vehicle;

FIGURE 2 is a sectional plan of manually operated locking mechanism for the pedal shown in FIGURE 1;

FIGURE 3 is a side elevation of an alternative form of pedal for actuating brakes either mechanically or hydraulically;

FIGURE 4 is a fragmentary perspective view of the selective mechanism associated with the pedal shown in FIGURE 3;

FIGURES 5 and 6 are diagrammatic cross sections of the selective mechanism showing the pedal in two positions;

FIGURE 7 is a side elevation of another form of pedal;

FIGURE 8 is a fragmentary perspective view of the selective mechanism associated with the pedal shown in FIGURE 7;

FIGURES 9, 10 and 11 are diagrammatic cross-sections of the selective mechanism showing three different positions of the pedal.

In the arrangement shown in FIGURES 1 and 2, 10 is a brake pedal lever mounted to pivot about a pin 11 in a fork in the outer end of a short shaft 12, the axis of the pin being at right angles to the axis of the shaft. A lug 13 mounted on the pedal lever carries a socket 14 in which is universally mounted one end of a thrust rod 15 which actuates the piston of an hydraulic master cylinder 16 mounted on a bracket 17 which is itself rigidly mounted on a convenient part of a vehicle.

The shaft 12 is mounted for angular movement about its axis in a housing 18 secured to the bracket 17. A flanged boss 19 is pinned or otherwise keyed on the inner end of the shaft which extends through the housing, and a cranked plate 21 is bolted to the flange of the boss. One arm of the plate extends in a direction parallel to but is offset from the axis of the spindle and has a slot 22 in its free end to receive the rocking spindle 23 of a valve 24.

When the pedal is depressed, liquid is displaced from the master cylinder to the valve 24 and is directed, according to the position of the spindle 23, into both or either of two outlets 25, 26 connected respectively to slave cylinders for applying brakes on wheels on opposite sides of the vehicle.

The pedal lever is provided with a foot pad 27 of substantial width, and when the driver applies the brake by depressing the pedal lever with his foot substantially in the middle of the foot pad, there is no component of the applied force tending to cause angular movement of the shaft 12 and therefore no displacement of the spindle 23 of the valve, and liquid from the master cylinder is supplied to the slave cylinders of the brakes on both sides of the vehicle which are applied with substantially equal force for retarding the progress of the vehicle.

To apply the brakes on one side only of the vehicle for steering purposes, the driver applies pressure to one side or other of the foot pad. This depresses the pedal lever to actuate the piston of the master cylinder and at the same time moves the shaft 12 angularly in its housing so that the cranked plate 21 rocks the spindle of the valve and cuts off the supply of liquid through one of the outlets 25, 26 and the whole of the braking effort is applied to the brakes supplied with liquid from the other outlet.

When the brakes on both sides of the vehicle are to be applied simultaneously, it is desirable to provide means for preventing angular movement of the shaft 12.

One convenient form of control is shown in FIGURE 2. A hole pierced in the flange of the boss 19 is adapted to receive a locking peg 28 which is slidably mounted in a bore in a lug 29 on the housing 18 and is urged into the locking position by a spring 30. The plunger is connected by a rod or cable 31 to a plunger 32 slidably and rotatably mounted in a fitting 33 located in any convenient position within reach of the driver. The plunger is provided with a knob 34 and with a cross-pin 35 which by angular movement of the plunger can be entered into either of two axially spaced notches 36, 37 in the fitting corresponding to the engaged and disengaged positions of the locking peg 28. If the rod or cable should break the spring 30 holds the peg 28 in the locking position shown in the drawing so that the brakes on both sides of the vehicle will be applied when the pedal is depressed.

In the arrangement shown in FIGURES 3 to 6, a pedal lever 41 provided with a foot pad 42 of substantial width is pivoted on a pin 43 in a fork in a shaft 44 mounted for angular movement about its axis in a stationary housing 45, the axis of the pin 43 being at right angles to the axis of the shaft. Adjacent to its pivot the pedal lever carries a rigid arm 46 extending downwardly substantially at right angles to the lever and lying between two parallel transmission members 47, 48 which are slidably mounted on a bracket 49 and are connected mechanically or hydraulically to the brakes on opposite sides of a vehicle. The members 47, 48 are loaded by springs 51 which urge them towards the off position. The width of the arm 46 in a direction at right angles to the line of movement of the member 47, 48 is greater than the distance between the members, but less than the width between the bases of opposed rectangular recesses 52, 53 in the members with which the arm co-operates. In the normal position of the pedal lever, the arm 46 is in a central position engaging with both members as shown in FIGURE 4, so that when the pedal is depressed the brakes on both sides of the vehicle are applied simultaneously.

If it is desired to apply the brakes on one side only of the vehicle, pressure is applied to one side or other of the foot pad 42 and the shaft 44 moves angularly in its housing so that the arm 46 is disengaged from one of the transmission members 47, 48 but is maintained in engagement with the other as shown in FIGURES 5 and 6.

The pedal lever or the shaft 44 may be loaded by a spring or other resilient means for holding it normally in an angular position in which the arm 46 engages with both transmission members.

This arrangement is suitable for brake installations which require a constant pedal movement, and where the corresponding variable effort is not important.

In the arrangement shown in FIGURES 7 to 11, a pedal lever 55 is pivoted on a transverse pin 56 in a fork in a shaft 57 which is mounted for angular movement about its axis in a housing 58 mounted on a stationary bracket 59. Adjacent to the pivot the arm has a rigid depending arm 61 on the lower end of which a balance bar 62 is pivoted by means of a pin 63. Links 64, 65 are pivotally attached to the balance bar at equal distances from and on opposite sides of the pivot pin 63 and are respectively connected mechanically or hydraulically to the brakes on opposite sides of the vehicle. The balance bar is located between stationary parallel walls 66, 67 spaced apart at a distance slightly greater than the length of the balance bar, and a recess 68 is provided in each wall in a position such that the recesses are in alignment with the balance bar in the off position of the brake, as shown in FIGURE 8.

When the brakes are applied by pressure on the centre of the foot pad of the pedal lever the balance bar is clear of both walls, as shown in FIGURE 9, and moves freely with the arm 61 so that the brakes on both sides of the vehicle are applied simultaneously.

When it is desired to apply the brakes on one side only of the vehicle, pressure is applied to one side or other of the foot pad. This rocks the shaft 57 and pedal lever about the axis of the shaft so that one end of the balance bar enters the recess 68 in one or other of the walls 66, 67 as shown in FIGURES 10 and 11. That end of the balance bar is then held against movement and the whole of the force applied to the pedal is applied to the link coupled to the other end of the balance bar and hence to the brakes actuated through that link.

This arrangement is suitable for brake installations which require a substantially constant pedal effort and where the corresponding variation in pedal travel is not important.

I claim:
1. Means for applying simultaneously and independently brakes on wheels on opposite sides of a vehicle comprising a pedal lever angularly movable about its longitudinal axis and about an axis at right angles to its longitudinal axis for applying the brakes, a foot pad of substantial width on one end of said lever, a shaft angularly movable about its axis in a stationary housing, a pivotal connection between said shaft and the other end of said lever, the axis of said pivotal connection being at right angles to the axes of the shaft and said lever, individual means for applying the brakes on wheels on opposite sides of the vehicle, and selective means controlled by the angular position of said shaft and said pedal lever about their longitudinal axes for selectively transmitting a force applied through said foot pad to said pedal lever to either or both of said brake applying means.

2. Means for applying simultaneously and independently brakes on wheels on opposite sides of a vehicle comprising a pedal lever angularly movable about its longitudinal axis and about an axis at right angles to its longitudinal axis for applying the brakes, a foot pad of substantial width on one end of said lever, a shaft angularly movable about its axis in a stationary housing, a pivotal connection between said shaft and the other end of said lever, the axis of said pivotal connection being at right angles to the axes of the shaft and said pedal lever, a hydraulic master cylinder actuated by said pedal lever, a valve controlling the delivery of liquid from said master cylinder to slave cylinders of wheel brakes on opposite sides of the vehicle, and means actuated by angular movement of said shaft and of said pedal lever about their longitudinal axes for actuating said valve to direct liquid from the master cylinder selectively to the slave cylinders of the wheel brakes on either or both sides of the vehicle.

3. Means for applying simultaneously and independently brakes on wheels on opposite sides of a vehicle comprising a pedal lever angularly movable about its longitudinal axis and about an axis at right angles to its longitudinal axis for applying the brakes, a foot pad of substantial width on one end of said lever, a shaft angularly movable about its axis in a stationary housing, a pivotal connection between said shaft and the other end of said lever, the axis of said pivotal connection being at right angles to the axes of the shaft and said lever, an arm rigid with said pedal lever and extending substantially at right angles thereto, parallel transmission members located on opposite sides of said arm for actuating the brakes on wheels on opposite sides of the vehicle, and means for selectively coupling said arm to either or both of said transmission members in accordance with the angular position of said shaft and said pedal lever about their longitudinal axes.

4. Means as in claim 3, wherein the spacing between said transmission members is less than the width of said arm in a direction at right angles to the transmission members, and transversely aligned notches are formed in the transmission members of such dimensions that when said arm is entered into the notch in one transmission member by angular movement of said shaft the arm is free of the other transmission member.

5. Means for applying simultaneously and independently brakes on wheels on opposite sides of a vehicle comprising a pedal lever angularly movable about its longitudinal axis and about an axis at right angles to its longitudinal axis for applying the brakes, a foot pad of substantial width on one end of said lever, a shaft angularly movable about its axis in a stationary housing, a pivotal connection between said shaft and the other end of said lever, the axis of said pivotal connection being at right angles to the axes of the shaft and said lever, an arm rigid with said pedal lever and extending substantially at right angles thereto, a balance bar pivotally mounted on the free end of said arm, transmission members pivotally connected to the balance bar on opposite sides of the arm and adapted respectively to apply brakes on wheels on opposite sides of the vehicle, parallel stationary walls between which said balance bar is located and which are spaced apart at a distance greater than the length of the balance bar, and recesses in said walls with which the balance bar is in alignment in the off position of the brake pedal and into either of which one end of the balance bar can enter on angular movement of said shaft and said brake lever about their longitudinal axes.

References Cited by the Examiner
UNITED STATES PATENTS

| 1,625,151 | 4/27 | Piche | 188—16 |
| 2,259,794 | 10/41 | Boldt | 188—152.16 |
| 2,894,608 | 7/59 | Wittren | 188—152 |

FOREIGN PATENTS

| 213,108 | 3/24 | Great Britain. |
| 309,470 | 4/29 | Great Britain. |
| 322,269 | 12/29 | Great Britain. |

ARTHUR L. LA POINT, *Primary Examiner.*